United States Patent
Chan

(10) Patent No.: US 11,059,494 B1
(45) Date of Patent: Jul. 13, 2021

(54) SYSTEM AND METHOD FOR TRANSFERRING PREFERENCES FOR AUTONOMOUS DRIVING

(71) Applicant: STATE FARM MUTUAL AUTOMOBILE INSURANCE COMPANY, Bloomington, IL (US)

(72) Inventor: Aaron Scott Chan, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 31 days.

(21) Appl. No.: 15/897,603

(22) Filed: Feb. 15, 2018

(51) Int. Cl.
| | |
|---|---|
| *B60W 50/10* | (2012.01) |
| *B60W 50/12* | (2012.01) |
| *B60W 10/04* | (2006.01) |
| *B60W 10/18* | (2012.01) |
| *B60W 10/20* | (2006.01) |
| *B60W 40/08* | (2012.01) |
| *B60W 40/09* | (2012.01) |
| *B60W 50/00* | (2006.01) |
| *B60W 50/14* | (2020.01) |

(52) U.S. Cl.
CPC ........ *B60W 50/0098* (2013.01); *B60W 50/14* (2013.01); *B60W 2050/0077* (2013.01); *B60W 2050/0083* (2013.01); *B60W 2050/146* (2013.01); *B60W 2556/65* (2020.02)

(58) Field of Classification Search
None
See application file for complete search history.

(56) References Cited

U.S. PATENT DOCUMENTS

| | | | |
|---|---|---|---|
| 9,547,309 B2* | 1/2017 | Ross | G08G 1/20 |
| 9,576,254 B2* | 2/2017 | McGuire | G06Q 10/02 |
| 9,754,501 B2 | 9/2017 | Stenneth | |
| 10,183,679 B2* | 1/2019 | Huber | B60W 50/0098 |
| 10,241,509 B1* | 3/2019 | Fields | G07C 5/0808 |

(Continued)

FOREIGN PATENT DOCUMENTS

| | | |
|---|---|---|
| WO | WO-2016/109540 A1 | 7/2016 |
| WO | WO-2017/142935 A1 | 8/2017 |
| WO | WO-2017/172415 A1 | 10/2017 |

*Primary Examiner* — Adam D Tissot
*Assistant Examiner* — Laura E Linhardt
(74) *Attorney, Agent, or Firm* — Marshall, Gerstein & Borun LLP

(57) ABSTRACT

Systems and methods for transferring autonomous driving preferences between vehicles are provided. For example, a vehicle operator may borrow a friend's or spouse's vehicle, or may rent a vehicle, and may wish to transfer his or her autonomous driving preferences to the vehicle he or she is currently operating. An autonomous driving preference associated with an operator of a first vehicle is obtained. The autonomous driving preference includes vehicle controls that the operator prefers to be operated autonomously, semi-autonomously, and/or manually. When the operator of the first vehicle is to operate a second vehicle or is currently operating a second vehicle, an indication of the autonomous driving preference associated with the operator is transmitted to the second vehicle, and the vehicle controls associated with the second vehicle are modified based on the autonomous driving preference associated with the operator.

20 Claims, 7 Drawing Sheets

(56) References Cited

U.S. PATENT DOCUMENTS

| | | | |
|---|---|---|---|
| 10,246,102 B2* | 4/2019 | Graney | B60W 50/0098 |
| 2011/0060480 A1* | 3/2011 | Mottla | G06Q 10/02 |
| | | | 701/2 |
| 2015/0350413 A1* | 12/2015 | Ma | H04M 1/72577 |
| | | | 455/418 |
| 2017/0068245 A1 | 3/2017 | Scofield et al. | |
| 2017/0088143 A1* | 3/2017 | Goldman-Shenhar | |
| | | | B60K 35/00 |
| 2017/0124658 A1 | 5/2017 | Gordon et al. | |
| 2017/0126810 A1* | 5/2017 | Kentley | H04L 67/125 |
| 2017/0232914 A1* | 8/2017 | Brenner | B60R 16/037 |
| | | | 701/36 |
| 2017/0334450 A1 | 11/2017 | Shiraishi et al. | |
| 2017/0369052 A1* | 12/2017 | Nagy | B60W 50/08 |
| 2019/0025856 A1* | 1/2019 | Turato | B60W 10/18 |
| 2019/0092341 A1* | 3/2019 | Stark | G05D 1/0088 |

\* cited by examiner

SYSTEM AND METHOD FOR TRANSFERRING PREFERENCES FOR AUTONOMOUS DRIVING

FIELD OF DISCLOSURE

In general, the present application is related to autonomous vehicles. In particular, the present application is related to systems and methods for automatically transferring autonomous driving preferences between vehicles.

BACKGROUND

Individuals have been operating vehicles as a means of transportation for decades. Recently, more and more vehicles have incorporated autonomous or semi-autonomous vehicle controls, such as, for example, autonomous or semi-autonomous steering, braking, acceleration, etc. In his or her usual vehicle, a vehicle operator may become accustomed to or otherwise develop a preference with respect to which vehicle controls are operated autonomously. However, in some instances, such as when renting or borrowing a vehicle, a vehicle operator must operate a new or different vehicle. Moreover, the new or different vehicle may have different autonomous settings or autonomous driving capabilities than the operator's usual vehicle.

SUMMARY

In one aspect, a computer-implemented method for automatically transferring autonomous driving preferences between vehicles is provided. The method includes obtaining, by a processor, an autonomous driving preference associated with an operator of a first vehicle, wherein the autonomous driving preference includes at least one of the following: (i) a vehicle control that the operator prefers to be operated autonomously, (ii) a vehicle control that the operator prefers to be operated semi-autonomously, or (iii) a vehicle control that the operator prefers to operate manually. The method further includes determining, by a processor, that the operator of the first vehicle is to operate a second vehicle or is currently operating a second vehicle, transmitting, by a processor, an indication of the autonomous driving preference associated with the operator to the second vehicle, and modifying, by a processor, one or more vehicle controls associated with the second vehicle based on the autonomous driving preference associated with the operator.

In another aspect, a computer system configured to automatically transfer autonomous driving preferences between vehicles is provided. A computer system comprises one or more processors and one or more memories storing instructions that are executed by the one or more processors. The instructions, when executed, cause the computer system to obtain an autonomous driving preference associated with an operator of a first vehicle, wherein the autonomous driving preference includes at least one of the following: (i) a vehicle control that the operator prefers to be operated autonomously, (ii) a vehicle control that the operator prefers to be operated semi-autonomously, or (iii) a vehicle control that the operator prefers to operate manually. The instructions, when executed, further cause the computer system to determine that the operator of the first vehicle is to operate a second vehicle or is currently operating a second vehicle, transmit an indication of the autonomous driving preference associated with the operator to the second vehicle, and modify one or more vehicle controls associated with the second vehicle based on the autonomous driving preference associated with the operator.

In still another aspect, a computer-readable storage medium having stored thereon a set of instructions, executable by a processor, for automatically transferring autonomous driving preferences between vehicles is provided. The instructions include instructions for obtaining an autonomous driving preference associated with an operator of a first vehicle, wherein the autonomous driving preference includes at least one of the following: (i) a vehicle control that the operator prefers to be operated autonomously; (ii) a vehicle control that the operator prefers to be operated semi-autonomously; or (iii) a vehicle control that the operator prefers to operate manually. The instructions further include instructions for determining that the operator of the first vehicle is to operate a second vehicle or is currently operating a second vehicle, transmitting an indication of the autonomous driving preference associated with the operator to the second vehicle, and modifying one or more vehicle controls associated with the second vehicle based on the autonomous driving preference associated with the operator.

DETAILED DESCRIPTION

Figure 1:
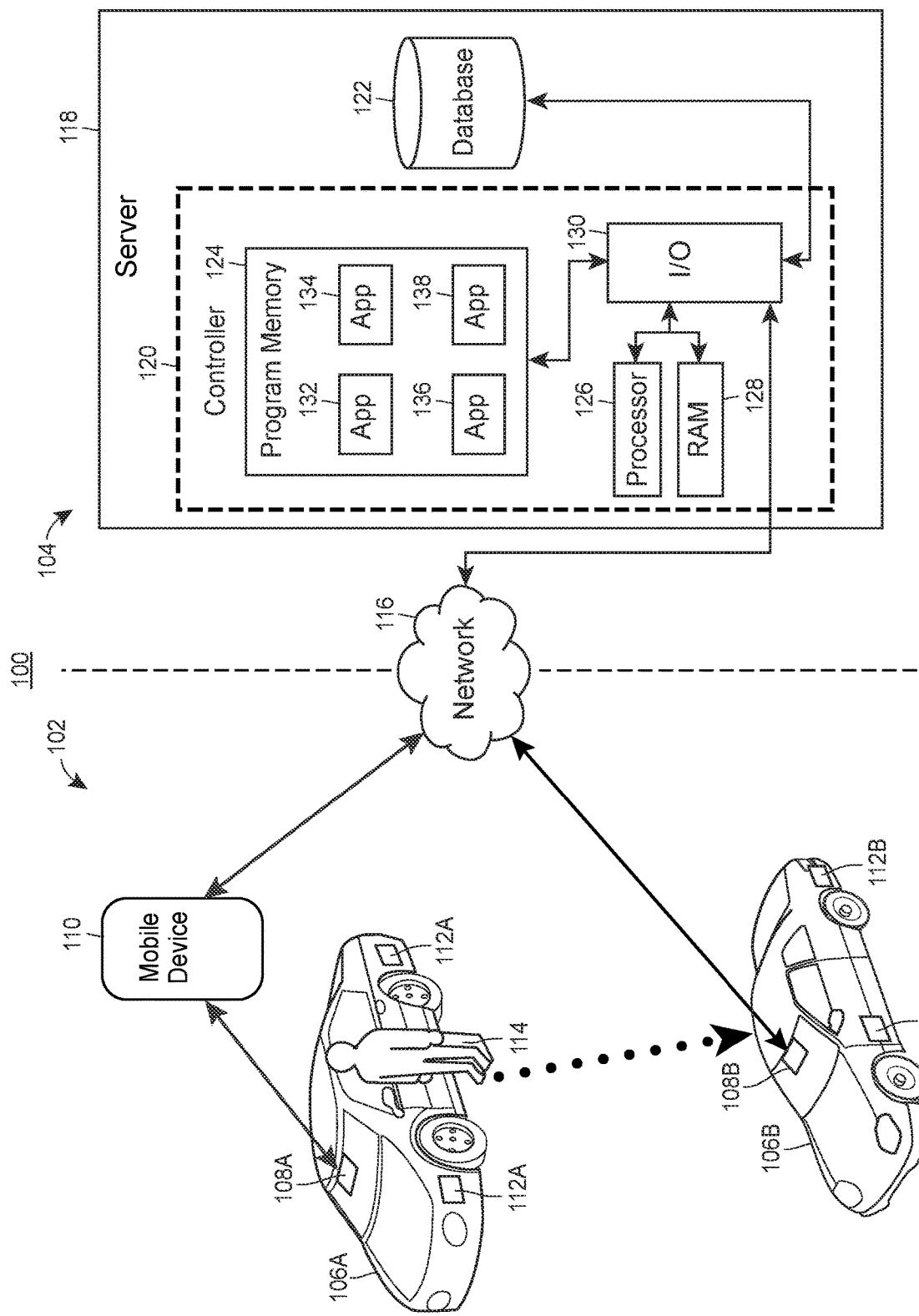
FIG. 1 illustrates an exemplary computer system for automatically transferring autonomous driving preferences between vehicles, in accordance with some embodiments.

As discussed above, more and more vehicles have incorporated autonomous or semi-autonomous vehicle controls, such as, for example, autonomous or semi-autonomous steering, braking, acceleration, etc. In his or her usual vehicle, a vehicle operator may become accustomed to or otherwise develop a preference with respect to which vehicle controls are operated autonomously. However, in some instances, such as when renting or borrowing a vehicle, a vehicle operator must operate a new or different vehicle. Moreover, the new or different vehicle may have different autonomous settings or autonomous driving capabilities than the operator's usual vehicle.

Systems and methods for automatically transferring autonomous driving preferences between vehicles are provided herein. For example, a vehicle operator may borrow a friend's or spouse's vehicle, or may rent a vehicle, and may wish to automatically transfer his or her autonomous driving preferences to the vehicle he or she is currently operating. According to the present teachings, an autonomous driving preference associated with the operator is obtained, including an indication of which vehicle controls (such as steering, acceleration, braking, etc.) the operator prefers to be operated autonomously, semi-autonomously, and/or manually. When the operator is to operate a new or different vehicle or is currently operating a new or different vehicle, an indication of the autonomous driving preference associated with the operator is transmitted to the different vehicle, and the vehicle controls associated with the new or different vehicle are modified based on the autonomous driving preference associated with the operator. In some examples, modifying the vehicle controls associated with the new vehicle includes modifying the settings of the new or different vehicle so that some vehicle controls are operated manually while other vehicle controls are operated autonomously or semi-autonomously, according to the autonomous driving preference associated with the operator.

The systems and methods provided herein therefore offer numerous benefits. In particular, the systems and methods effectively and efficiently modify autonomous vehicle controls based on an autonomous driving preference associated with a vehicle operator, allowing the vehicle operator to seamlessly transition between vehicles. In this way, the safety of the operation of the vehicle may be improved. That is, because an operator's current vehicle controls are modified based on the operator's autonomous driving preferences, operator confusion in operating a new vehicle may be reduced. Moreover, any adjustment or "break-in" period for the operator as he or she operates the new vehicle may be minimized. Beneficially, an operator will likely be less distracted by adjusting to the autonomous vehicle control settings of the vehicle, and more focused on the operation of the vehicle, improving the safety of the vehicle overall.

Additionally, in some embodiments, the autonomous driving preference of the vehicle operator and/or the autonomous capabilities of the operator's original vehicle are compared to the autonomous capabilities of the new or different vehicle (i.e., the rented or borrowed vehicle). In instances in which the new or different vehicle is incapable of operating a particular vehicle control autonomously or semi-autonomously according to the operator's autonomous driving preferences, a notification may be generated for the operator indicating that the vehicle is not capable of operating the particular vehicle control autonomously or semi-autonomously. Advantageously, the operator will be made aware that the new vehicle is not capable of the same autonomous vehicle controls as the operator's usual vehicle and will not expect autonomous operation where manual operation is required. In particular, safety is improved as the risk of an operator assuming, for instance, that a manual vehicle control will operate autonomously or semi-autonomously is reduced.

On the other hand, in instances in which the new vehicle is capable of operating additional vehicle controls autonomously or semi-autonomously (i.e., that the operator's usual vehicle is not capable of operating autonomously or semi-autonomously), a notification may be generated for the operator indicating that operating these vehicle controls autonomously or semi-autonomously is an option. Advantageously, the operator will be made aware of the autonomous capabilities of the new vehicle, and may choose to engage the newly available autonomous or semi-autonomous vehicle controls if desired.

Furthermore, in some embodiments, a new or different vehicle may be selected for the vehicle operator based on the autonomous driving preference associated with the operator. That is, among available vehicles (e.g., vehicles available to rent), a particular vehicle may be selected for the operator based how closely the autonomous capabilities of the vehicle match the autonomous driving preferences of the operator. For example, if the operator prefers manual steering and autonomous braking, a vehicle that the operator can steer manually but that is capable of autonomous braking may be selected for the operator. Advantageously, the operator may operate the new vehicle with minimal adjustments based on autonomous driving preferences.

In particular, the systems and methods discussed herein address challenges that are particular to autonomous vehicle operation, such as the challenge of minimizing the adjustment period that a vehicle operator may experience as he or she switches between various autonomous vehicles. For example, an autonomous vehicle operator who is accustomed to or prefers particular autonomous vehicle controls may have difficulty safely operating an autonomous vehicle with different autonomous capabilities and/or default settings. Using conventional methods, an autonomous vehicle operator who expects a particular vehicle control to be operated autonomously may be slow to realize that he or she needs to manually operate the vehicle control, which may lead to unsafe vehicle operation. For example, an autonomous vehicle operator who is accustomed to or prefers autonomous braking may not realize that he or she needs to manually apply the brakes in the current vehicle, which may lead to a vehicle accident at times when manual braking is required.

The systems and methods provided herein offer improved capabilities to solve these problems by automatically transferring a vehicle operator's autonomous driving preferences between vehicles, and by notifying a vehicle operator when his or her current vehicle's autonomous driving capabilities do not match the vehicle operator's autonomous driving preferences. Accordingly, a vehicle operator may seamlessly transition between autonomous vehicles as needed, and may be aware of vehicle controls for which manual operation is required.

Similarly, the systems and methods provide improvements in a technical field, namely, autonomous vehicle operation. Instead of the systems and methods merely being performed by hardware components using basic functions, the systems and methods employ complex steps that go beyond the mere concept of simply retrieving and combining data using a computer. In particular, the hardware components control the operation of the vehicle and modify vehicle controls based on the autonomous driving preference associated with an operator, among other functionalities.

According to implementations, the systems and methods may support a dynamic, real-time or near-real-time analysis of any captured, received, and/or detected data. In particular, in some embodiments, an electronic device in a vehicle may receive an indication that a particular operator is entering or near the vehicle in real-time or near real-time, and may automatically and dynamically modify vehicle controls based on the autonomous driving preference associated with the entering or nearby operator. In this regard, any operator is afforded the benefit of accurate and relevant data, and may, for instance, seamlessly transition between various autonomous vehicles.

FIG. 1 illustrates an exemplary computer system 100 for automatically transferring autonomous driving preferences between vehicles, in accordance with some embodiments. The high-level architecture illustrated in FIG. 1 may include both hardware and software applications, as well as various data communications channels for communicating data between the various hardware and software components, as is described below. The system 100 may be roughly divided into front-end components 102 and back-end components 104.

The front-end components 102 may obtain information regarding a vehicle, such as vehicle 106A or vehicle 106B (which may be, e.g., cars, trucks, motorcycles, etc.), and its surrounding environment, and may communicate with the back-end components 104 via a network 116. As shown in FIG. 1, the front-end components 102 may include on-board computers 108A, 108B (associated with vehicles 106A and 106B, respectively) and/or a mobile device 110 (associated with vehicle 106A). Of course, in some instances, both vehicles 106A, 106B are associated with respective mobile devices. Moreover, in some instances, neither of the vehicles 106A, 106B are associated with a mobile device.

The on-board computers 108A, 108B and/or mobile device 110 may utilize the obtained information to autonomously or semi-autonomously operate the respective vehicles 106A, 106B. Different vehicles may have different autonomous driving capabilities. For example, vehicle 106A may be capable of autonomous braking, but not autonomous steering or acceleration, while vehicle 106B may be capable of semi-autonomous steering, but not autonomous braking or acceleration. As another example, vehicle 106A may be fully autonomous and may be incapable of manual operation, while vehicle 106B is fully manual and not capable of autonomous operation.

Based on each vehicle's autonomous driving capabilities, vehicles may be capable of switching between various autonomous modes depending on the preferences of a vehicle operator 114. For example, vehicle 106A may be capable of switching between manual and semi-autonomous braking based on the preferences of the operator 114. As another example, vehicle 106B may be capable of switching between autonomous and manual steering. In particular, when an operator 114 switches vehicles from a first vehicle 106A to a second vehicle 106B (e.g., when the operator 114 typically operates vehicle 106A but is currently borrowing or renting vehicle 106B), the operator 114's autonomous driving preferences may be automatically transferred from the first vehicle 106A to the second vehicle 106B.

The front-end components 102 may further include one or more sensors 112A, 112B associated with respective vehicles 106A, 106B that may communicate sensor data to the respective on-board computers 108A, 108B and/or mobile device 110. Additionally, the front-end components 102 may include communication components (not shown) associated with one of more of the vehicles 106A, 106B and configured to interface with the respective on-board computers 108A, 108B and/or mobile device 110 to transmit and receive information from external sources, such as back-end components 104 and/or other vehicles. The front-end components 102 may further include an internal audio component (not shown) and/or an internal display component (not shown) disposed within the one or more of the vehicles 106A, 106B that may be configured to respectively sound or display various alerts, notifications, warnings, etc. generated by the on-board computers 108A, 108B and/or mobile device 110. Additionally, the front-end components 102 may include user-input devices (not shown) disposed within one or more of the vehicles 106A, 106B that may be configured to receive instructions or information from the vehicle operator 114. Of course, additional or alternative front-end components 102 (or combinations of the front-end components 102) for performing similar or different functions may be included in various embodiments.

In embodiments, the front-end components 102 of the vehicles 106A, 106B may communicate information to the back-end components 104, e.g., via the network 116. For example, at least one of the on-board computers 108A, 108B and/or mobile device 110 may communicate with the back-end components 104 via the network 116 to allow the back-end components 104 to record collected sensor data and/or any other information obtained by the front-end components regarding one or more of the vehicles 106A, 106B, the surrounding environment, and/or other nearby vehicles. The network 116 may include a proprietary network, a secure public internet, a virtual private network, and/or some other type of network. For example, other types of networks may include dedicated access lines, plain ordinary telephone lines, satellite links, cellular data networks, vehicle-to-vehicle communication networks, vehicle-to-infrastructure communication networks, vehicle-to-cellular communication networks, vehicle-to-object networks, cellular hybrid networks, and/or combinations of these and/or other types of networks. The network 116 may utilize one or more radio frequency communication links, via, e.g., dedicated short range communication protocol, to communicatively connect to the vehicles 106A, 106B, e.g., utilize wireless communication links to communicatively connect with on-board computers 108A, 108B and mobile device 110, respectively. Where the network 116 comprises the Internet or other data packet network, data communications may take place over the network 116 via an Internet or other suitable data packet communication protocol. In some arrangements, the network 116 may additionally or alternatively include one or more wired communication links or networks.

Generally speaking, the on-board computers 108A, 108B may be, for instance, general-use computers capable of performing many functions relating to vehicle operation or a dedicated computer for autonomous vehicle operation, in various embodiments. Further, the on-board computers 108A, 108B may be installed by the manufacturers of the respective vehicles 106A, 106B or as an aftermarket modification or addition to the respective vehicles 106A, 106B. The mobile device 110 may be, for instance, a general-use personal computer, cellular phone, smart phone, tablet computer, smart watch, wearable electronics, a dedicated vehicle monitoring or control device, or any other suitable mobile device. The on-board computers 108A, 108B and/or the mobile device 110 may run various applications for collecting, generating, processing, analyzing, transmitting, receiving, and/or acting upon data associated with the respective vehicles 106A, 106B (e.g., sensor data; location data; operator autonomous driving preferences; other operator or passenger data including selections, dismissals, and/or settings, by operators or passengers; autonomous operation feature settings; autonomous operational modes; control decisions made by the autonomous operation features; etc.), the vehicle environment, and/or other nearby vehicles. As discussed above, the on-board computers 108A, 108B and/or the mobile device 110 may communicate with the network 116 over respective links. Additionally or alternatively, the on-board computer 108A or the mobile device 110 may communicate with the on-board computer 108B (and/or vice-versa) directly over a link.

In particular, the on-board computer 108A or mobile device 110 may directly or indirectly control the operation of the vehicle 106A, while the on-board computer 108B may directly or indirectly control the operation of the vehicle 106B, according to various autonomous operation features. The autonomous operation features may include software applications or modules implemented by the on-board computers 108A, 108B and/or mobile device 110 to generate and implement control commands to control the operation of the respective vehicles 106A, 106B (e.g., steering, braking, acceleration, etc.). To facilitate such control, the on-board computers 108A, 108B and/or the mobile device 110 may be communicatively connected to control components of the respective vehicles 106A, 106B by various electrical or electromechanical control components (not shown). Control commands may be generated by the on-board computers 108A, 108B and/or mobile device 110 and may be communicated to the control components of the respective vehicles 106A, 106B, to effect a control action. In embodiments involving fully autonomous vehicles and/or fully autonomous operational modes, the vehicles 106A, 106B may be operable only through such control components. In other embodiments (e.g., involving semi-autonomous vehicles and/or semi-autonomous operational modes), the control components may be disposed within or supplement other vehicle operator control components (not shown), such as steering wheels, accelerator or brake pedals, or ignition switches controlled by an operator 114 of one of the vehicles 106A, 106B.

Although one on-board computer 108A and one mobile device 110 are depicted as associated with vehicle 106A, and one on-board computer 108B is depicted as associated with vehicle 106B, in FIG. 1, it should be understood that some embodiments may include, for instance, a plurality of on-board computers 108A, 108B (which may be installed at one or more locations within the respective vehicles 106A, 106B) and/or a plurality of mobile devices 110 (including, for instance, a mobile device associated with vehicle 106B). In embodiments, such a plurality of on-board computers 108A, 108B and/or mobile devices 110 may perform functionalities described herein as being performed by just one of the on-board computers 108A, 108B or just one mobile device 110 per vehicle 106A, 106B. Additionally, in some embodiments the mobile device 110 may supplement the functions performed by the on-board computer 108A described herein, or vice versa. In other embodiments, the on-board computer 108A and the mobile device 110 may be integrated into a single device, or either may perform the functions of both. In some embodiments or under certain conditions, the on-board computers 108A, 108B or mobile device 110 may function as thin-client devices that outsource some or most of the processing to the back-end components 104.

The on-board computers 108A, 108B and/or mobile device 110 disposed at respective vehicles 106A, 106B may communicatively interface with the one or more respective on-board sensors 112A, 112B. The one or more on-board sensors 112A, 112B may detect conditions associated with the respective vehicle 106A, 106B and/or associated with the environment in which the respective vehicle 106A, 106B is operating, and may collect data indicative of the detected conditions. In particular, data detected by the sensors 112A, 112B may be communicated to the respective on-board computers 108A, 108B and/or the mobile device 110, for use in identifying a vehicle operator 114 entering or near the vehicle 106A, 106B, capturing data related to autonomous driving preferences of a vehicle operator 114, and/or autonomous vehicle operation. The sensors 112A, 112B may include, for instance, one or more of a GPS unit, a radar unit, a LIDAR unit, an ultrasonic sensor, an infrared sensor, an inductance sensor, a camera, an accelerometer, a tachometer, or a speedometer. Some of the sensors 112A, 112B (e.g., radar, LIDAR, or camera units) may actively or passively scan the vehicle environment for obstacles (e.g., other vehicles, buildings, pedestrians, etc.), roadways, lane markings, signs, or signals. Other of the sensors 112A, 112B (e.g., GPS, accelerometer, or tachometer units) may provide data for determining the location or movement of the vehicle 106A, 106B. Other sensors 112A, 112B may be directed to the interior or passenger compartment of the vehicles 106A, 106B, such as cameras, microphones, pressure sensors, thermometers, or similar sensors to monitor the vehicle operator 114 and/or passengers within the respective vehicles 106A, 106B. For instance, such interior sensors may be used to detect a particular operator 114 approaching a vehicle, or an indication of a selection or a dismissal (e.g., in response to an alert) by an operator 114 of the respective vehicle 106A, 106B. Of course, other embodiments may include additional or alternative sensors.

In some configurations, at least some of the on-board sensors 112A, 112B may be removably or fixedly disposed at various locations on the respective vehicles 106A, 106B. Additionally or alternatively, at least some of the on-board sensors 112A, 112B may be incorporated within or connected to the respective on-board computers 108A, 108B. Still additionally or alternatively, in some configurations, at least some of the on-board sensors 112A may be included on or within the mobile device 110.

Additionally, the on-board computers 108A, 108B and/or mobile device 110 disposed at the respective vehicles 106A, 106B may communicatively interface with the one or more communication components (not shown). The one or more communication components may be configured to transmit information to and receive information from the back-end components 104 and/or from other external sources, such as other vehicles, and/or infrastructure or environmental components (not shown) disposed within the environments of the respective vehicles 106A, 106B. The one or more communication components may include one or more wireless transmitters or transceivers operating at any desired or suitable frequency or frequencies. Different wireless transmitters or transceivers may operate at different frequencies and/or by using different protocols, if desired. In some embodiments, the one or more communication components may be removably or fixedly disposed at various locations within or external to the vehicles 106A, 106B. Additionally or alternatively, one or more communication component may be incorporated within or connected to the on-board computers 108A, 108B. Still additionally or alternatively, in some configurations, one or more communication component may be included on or within the mobile device 110.

In an example, the on-board computers 108A, 108B may operate in conjunction with a communication component that is disposed at the respective vehicle 106A, 106B for sending or receiving information to and from the a server 118 via the network 116, such as over one or more radio frequency links or wireless communication channels which support the first communication protocol and/or a second communication protocol. Additionally or alternatively, the mobile device 110 may include a respective communication component (not shown) for sending or receiving information to and from the server via the network 116, such as over one or more radio frequency links or wireless communication channels supporting a first communication protocol (e.g., GSM, CDMA, LTE, a protocol specific to intelligent transportation systems (e.g., IEEE 802.11p), one or more IEEE 802.11 Standards such as Wi-Fi, WiMAX, BLUETOOTH, etc.). In some embodiments, the on-board computer 108A may operate in conjunction with the mobile device 110 to utilize the communication component of the mobile device 110 to deliver information to the back-end components 104. In some embodiments, the on-board computer 108A may operate in conjunction with the mobile device 110 to utilize the communication component of the vehicle 106A to deliver information to the back-end components 104. In some embodiments, one or more communication components may be utilized by both the on-board computer 108A and the mobile device 110 to communicate with the back-end components 104. Accordingly, the on-board computers 108A, 108B and/or mobile device 110 may communicate with the network 116 over various links. Additionally, in some configurations, the on-board computers 108A, 108B and/or mobile device 110 may communicate with one another directly over a wireless or wired link.

Moreover, the on-board computer 108A and/or the mobile device 110 of the first vehicle 106A may communicate with the on-board computer 108B disposed at the second vehicle 106B, either directly or via the network 116. In embodiments, the on-board computer 108A and/or the mobile device 110 disposed at the first vehicle 106A may communicate with the on-board computer 108B of the second vehicle 106B via the network 116 and one or more communication components by using one or more suitable wireless communication protocols (e.g., GSM, CDMA, LTE, a protocol specific to intelligent transportation systems (e.g., IEEE 802.11p), one or more IEEE 802.11 Standards such as Wi-Fi, WiMAX, BLUETOOTH, etc.) In some embodiments, the on-board computer 108A and/or the mobile device 110 may communicate with the on-board computer 108B either directly or via the network 116, without utilizing the communication component. In these embodiments, one or more of the on-board computers 108A, 108B and/or the mobile device 110 may include a set of transceivers or other components configured to support the transmission and receipt of data.

As discussed above, the front-end components 102 of the system 100 may communicate with one or more back-end components 104. The back-end components 104 may include one or more servers 118. As shown in FIG. 1, the server 118 may include a controller 120 that may be operatively connected to the one or more databases 122 via a link, which may be a local or a remote link. The one or more databases 122 may be adapted to store data related to, for instance, autonomous operation features, autonomous driving preferences of an operator 114, autonomous driving capabilities of various vehicles, availability of various vehicles, identification information related to an operator 114, and/or communication features of the vehicles 106A, 106B. It should be noted that, while not shown, additional databases may be linked to the controller 120 in a known manner. For example, separate databases may be used for various types of information, such as autonomous operation feature information, vehicle accidents, road conditions, vehicle operation information, and/or any other suitable types of information. Additional databases (not shown) may be communicatively connected to the server 118 via the network 116, such as databases maintained by third parties (e.g., weather, construction, mapping, or road network databases). The controller 120 may include one or more program memories 124, one or more processors 126 (which may be, e.g., microcontrollers and/or microprocessors), one or more random-access memories (RAMs) 128, and an input/output (I/O) circuit 130, all of which may be interconnected via an address/data bus.

The server 118 may further include a number of various software applications 132, 134, 136, 138 stored in the program memory 124. Generally speaking, the applications may perform one or more functions related to, inter alia, autonomous or semi-autonomous operation of the vehicles 106A, 106B, automatically transferring autonomous driving preferences associated with an operator 114 from a first vehicle 106A to a second vehicle 106B, modifying vehicle controls of a vehicle 106A and/or a vehicle 106B based on the autonomous driving preferences of the operator 114, selecting a second vehicle 106B for the operator 114, and/or communications between the vehicles 106A, 106B and external sources. For example, one or more of the applications 132, 134, 136, 138 may perform at least a portion of any of the methods described herein, such as, e.g., method 400, method 500, method 600, and/or method 700.

The various software applications 132, 134, 136, 138 may be executed on the same computer processor 126 or on different computer processors. Although four software applications 132, 134, 136, 138 are shown in FIG. 1, it will be understood that there may be any number of software applications 132, 134, 136, 138. Further, two or more of the various applications 132, 134, 136, 138 may be integrated as an integral application, if desired.

It should be appreciated that although the server 118 is illustrated as a single device in FIG. 1, one or more portions of the server 118 may be implemented as one or more storage devices that are physically co-located with the server 118, or as one or more storage devices utilizing different storage locations as a shared database structure (e.g. cloud storage). In some embodiments, the server 118 may be configured to perform any suitable portion of the processing functions remotely that have been outsourced by one or more of on-board computers 108A, 108B and/or mobile device 110. In such embodiments, the server 118 may receive and process the data and send an indication to one or more of the on-board computers 108A, 108B and/or mobile device 110, and/or take other actions.

Moreover, although only one processor 126 is shown, the controller 120 may include multiple processors 126. Similarly, the controller 120 may include multiple program memories 124 and multiple RAMs 128. Although the I/O circuit 130 is shown as a single block, it should be appreciated that the I/O circuit 130 may include a number of different types of I/O circuits. The program memory 124 and RAM 128 may be implemented as semiconductor memories, magnetically readable memories, optically readable memories, or biologically readable memories, for example. Generally speaking, the program memory 124 and/or the RAM 128 may respectively include one or more non-transitory, computer-readable storage media. The controller 120 may also be operatively connected to the network 116 via a link.

Figure 2:
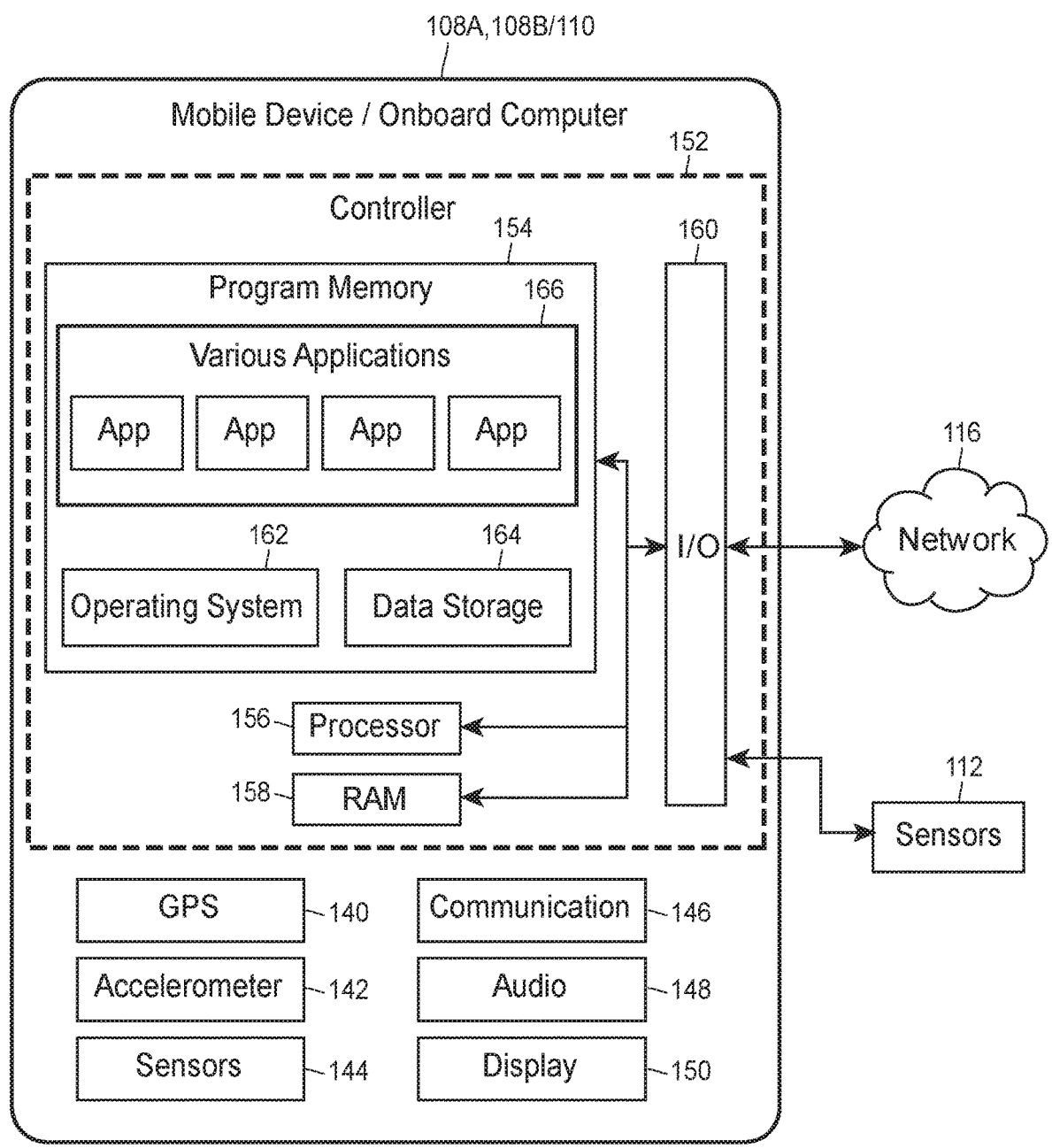
FIG. 2 illustrates an exemplary mobile device and/or onboard computer, in accordance with some embodiments.

FIG. 2 illustrates an exemplary on-board computer or mobile device, such as on-board computers 108A, 108B and/or mobile device 110 associated with the respective vehicles 106A, 106B consistent with the system 100. Each of the on-board computer 108A, 108B and/or mobile device 110 may include one or more of a GPS unit 140, an accelerometer 142, one or more sensors 144, a communication unit 146, an audio unit 148, a display unit 150, and/or a controller 152.

The GPS unit 140 may be disposed at the on-board computer 108A, 108B and/or mobile device 110 and may collect data indicating the location of the on-board computer 108A, 1088, the mobile device 110, and/or (e.g., by proxy) the respective vehicles 106A, 1068. This location information may be used, for instance, for autonomous operational features and/or mapping features of the vehicle 106A, 1068. Of course, additional or alternative uses of the GPS unit 140 may be envisioned. Moreover, in some embodiments the GPS unit 140 may be a separate device disposed within or external to the vehicle 106A, 1068, and interfacing with one or more of the on-board computers 108A, 1088 and/or mobile device 110.

The accelerometer 142 may be disposed at one or more of the on-board computers 108A, 1088 and/or mobile device 110 and may collect data indicating the acceleration of the on-board computers 108A, 1088, the mobile device 110, and/or (e.g., by proxy) the respective vehicles 106A, 106B. Moreover, in some embodiments the GPS unit 140 may be a separate device disposed within or external to the vehicles 106A, 1068, and interfacing with the on-board computers 108A, 1088 and/or mobile device 110.

In general, the sensors 144 may be disposed at the on-board computers 108A, 1088 and/or mobile device 110 and may perform similar functions (e.g., detecting that an operator 114 is nearby or is entering a respective vehicle 106A, 1068, detecting operator or passenger feedback, monitoring the environment outside of the vehicle 106A, 106B, etc.) as the sensors 112A, 1128 discussed above. Similarly, the communication unit 146 may be disposed at the on-board computer 108A, 1088 and/or mobile device 110 and may perform similar functions (e.g., transmitting and receiving information from external sources, etc.) as the communication component discussed above, the audio unit 148 may be disposed at the on-board computer 108A, 1088 and/or mobile device 110 and may perform similar functions (e.g., sounding various alerts, etc.) as the internal audio component discussed above, and the display unit 150 may be disposed at the on-board computer 108A, 1088 and/or mobile device 110 and may perform similar functions (e.g., displaying various alerts, displaying a user interface, etc.) as the internal display component discussed above. The sensors 144 may supplement and/or replace one or more of the corresponding sensors 112A, 1128. Similarly, the communication unit 146, audio unit 148, and/or display unit 150 may supplement and/or replace one or more of the corresponding communication component, internal audio component, and/or internal display component associated with the vehicle 106A, 1068, as discussed above.

The controller 152 may include a program memory 154, one or more processors (e.g., microprocessors) 156, RAM 158, and an I/O circuit 160, all of which may be interconnected via an address/data bus. The program memory 154 may include an operating system 162, a data storage 164, and/or a plurality of various software applications 166. The operating system 162, for example, may include one of a plurality of general purpose or mobile platforms, such as the Android™, iOS®, or Windows® systems, developed by Google Inc., Apple Inc., and Microsoft Corporation, respectively. Alternatively, the operating system 162 may be a custom operating system designed for autonomous vehicle operation using one or more of the on-board computers 108A, 1086 and/or mobile device 110. The data storage 164 may include data such as operator autonomous driving preferences, application data and/or routine data for the various applications 166, and other data related to autonomous operation features, automatically transferring autonomous driving preferences between vehicles, and/or communication features. In some embodiments, the controller 152 may also include, or otherwise be communicatively connected to, other data storage mechanisms (e.g., one or more hard disk drives, optical storage drives, solid state storage devices, etc.) residing within the vehicle 106A, 1066.

In embodiments, the controller 152 may include multiple program memories 154, processors 156 and/or RAMs 158. Moreover, although FIG. 2 depicts the I/O circuit 160 as a single block, the I/O circuit 160 may include a number of different types of I/O circuits. The controller 152 may implement the program memories 154 and/or the RAMs 158 as semiconductor memories, magnetically readable memories, or optically readable memories, for example. Generally speaking, the program memories 154 and/or the RAMs 158 may respectively include one or more non-transitory, computer-readable storage media. The one or more processors 156 may be adapted and configured to execute any of the various software applications 166 residing in the program memory 154, in addition to other software applications/routines.

Generally speaking, the applications 166 may perform one or more functions related to, inter alia, autonomous or semi-autonomous operation of the respective vehicles 106A, 106B, automatically transferring autonomous driving preferences associated with an operator 114 from a first vehicle 106A to a second vehicle 1066, modifying vehicle controls of a vehicle 106A, 1066 based on the autonomous driving preferences of the operator 114, selecting a second vehicle 1066 for the operator 114, and/or communications between the vehicle 106A, 1066 and external sources such as, e.g., the back-end components 104 and/or other vehicles. For example, one or more of the applications 166 may perform at least a portion of any of the methods described herein, such as, e.g., method 400, method 500, method 600, and/or method 700.

Figure 3:
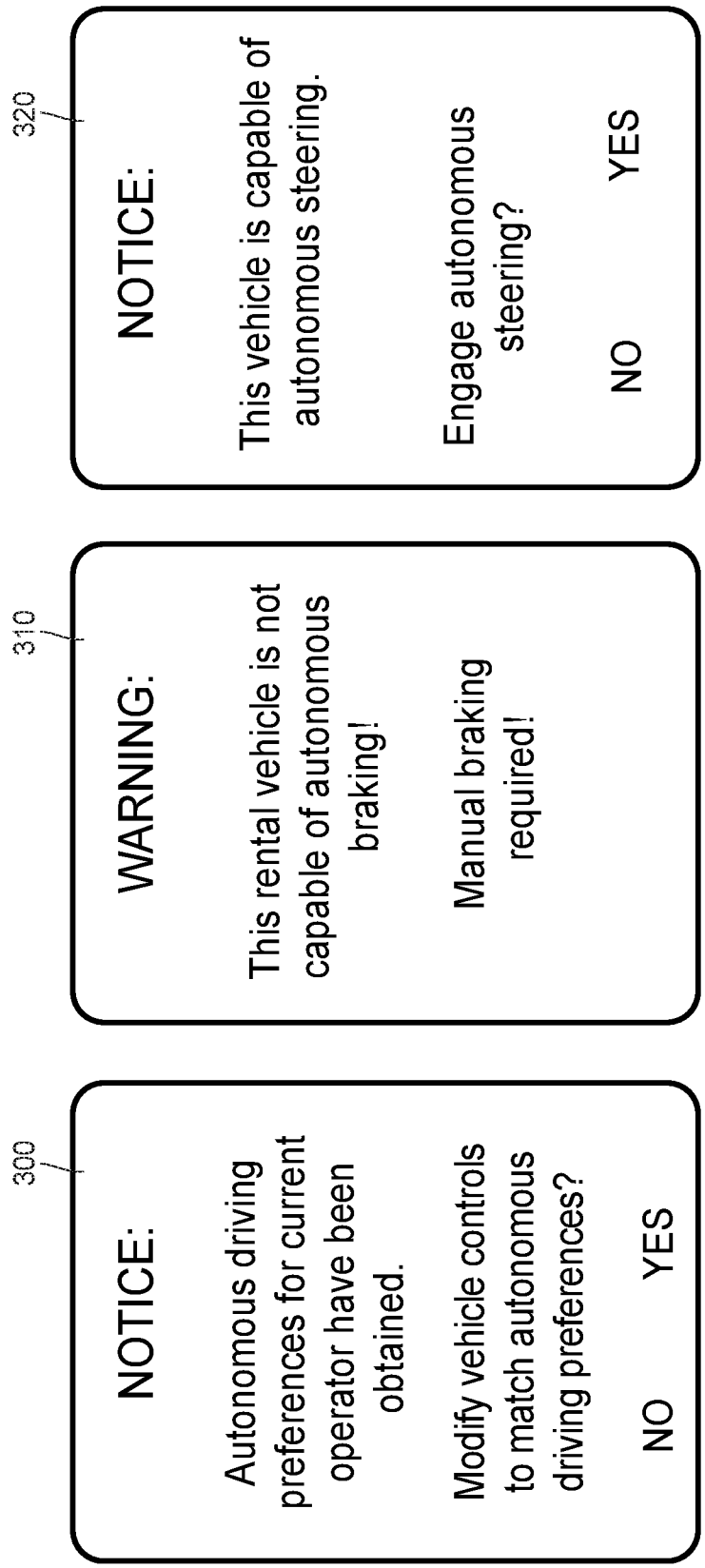
FIGS. 3A-3C illustrate several exemplary user interface displays, in accordance with some embodiments.

FIGS. 3A-3C respectively illustrate exemplary user interface displays 300, 310, 320, in accordance with some embodiments. For example, the user interface displays 300, 310, 320 may be displayed via a display component 150 of the onboard computers 108A, 108B and/or mobile device 110. The user interface displays 300, 310, 320 may be displayed to a vehicle operator once the vehicle operator has switched from one vehicle to another, e.g., as shown in FIG. 1, the operator 114 moves from a first vehicle 106A to a second vehicle 106B.

FIG. 3A illustrates an example user interface display 300. The operator may be notified, via user interface display 300, that an autonomous driving preference associated with the operator has been obtained. Furthermore, the operator may be prompted, via user interface display 300, to indicate whether the operator would like the vehicle controls of the vehicle to be modified to match the autonomous driving preference associated with the operator.

FIG. 3B illustrates an example user interface display 310. In one example, an autonomous driving preference associated with the operator may be obtained and compared to the autonomous driving capabilities of the second vehicle. In particular, based on the comparison, a notification may be generated for the operator indicating that there are vehicle controls that the second vehicle is not capable of operating according to the autonomous driving preference associated with the operator. As shown in example user interface display 310, the notification may indicate that the second vehicle is not capable of autonomous braking.

FIG. 3C illustrates an example user interface display 320. In one example, an autonomous driving capability associated with the first vehicle may be obtained and compared to the autonomous driving capabilities of the second vehicle. In particular, based on the comparison, a notification may be generated for the operator indicating that there are vehicle controls that the second vehicle is capable of operating autonomously but the first vehicle is not capable of operating autonomously. As shown in example interface display 320, the notification may indicate that the second vehicle is capable of autonomous steering (e.g., while the first vehicle was not capable of autonomous steering). Furthermore, the operator may be prompted, via the user interface display 320, to indicate whether the operator would like to engage the autonomous steering vehicle control.

Figure 4:
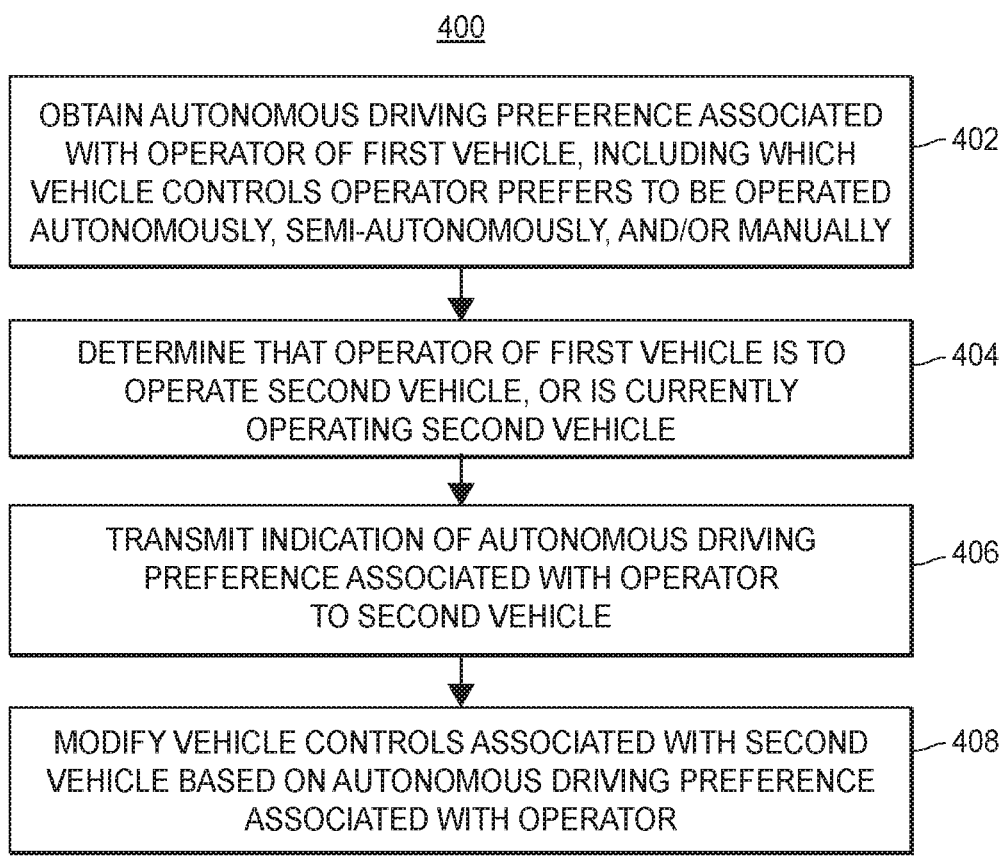
FIG. 4 illustrates a flow diagram of an exemplary computer-implemented method for automatically transferring autonomous driving preferences between vehicles, in accordance with some embodiments.

Turning now to FIG. 4, a flow diagram of an exemplary computer-implemented method 400 for automatically transferring autonomous driving preferences between vehicles is illustrated, in accordance with some embodiments. The method 400 can be implemented as a set of instructions stored on a computer-readable memory and executable on one or more processors.

An autonomous driving preference associated with an operator of a first vehicle may be obtained (block 402). The first vehicle may be a vehicle that the operator drives frequently and/or a vehicle that the operator owns. That is, the first vehicle may be the driver's usual vehicle. The autonomous driving preference may include, for example, one or more vehicle controls (such as, e.g., steering, acceleration, braking, etc.) that the operator prefers to be operated autonomously or semi-autonomously, and/or one or more vehicle controls that the operator prefers to operate manually. For example, the operator prefers the steering to be operated autonomously. As another example, the operator prefers the steering to be operated autonomously but the braking and acceleration to operate manually.

In some instances, the autonomous driving preference associated with the operator may be a level or category of autonomous driving that the operator prefers. For example, at level zero, steering, braking, and all other vehicle controls are operated manually; at level one, steering, braking, and all other vehicle controls are operated semi-autonomously; at level two, steering, braking, and all other vehicle controls are operated fully autonomously, etc. As another example, in one category, steering and acceleration are operated manually while braking is operated semi-autonomously; in another category, steering is operated semi-autonomously while braking and acceleration are operated manually; etc. That is, an autonomous driving category may include any combination of vehicle controls operated at various levels of automation.

Additionally or alternatively, the autonomous driving preference associated with the operator may include operator preferences with respect to following distance, speed taken for corners, off the line acceleration, braking deceleration, or other vehicle kinematics preferences. Moreover, the autonomous driving preference associated with the operator may include operator preferences with respect to whether to follow large vehicles without an underside guardrail, whether to follow vehicles with objects on the roof, whether to follow vehicles with inconsistent lane maintenance, frequency of lane changes, smoothness of drive, amount of lateral movement, whether to stay out of other vehicles' blind spots, etc.

In some instances, the autonomous driving preferences associated with an operator may be obtained using vehicle telematics data. For example, if the operator frequently engages autonomous braking rather than semi-autonomous braking in the first vehicle, the operator's preference for autonomous braking may be inferred by analyzing data collected by sensors or by the onboard computer and/or mobile device associated with the first vehicle. Additionally or alternatively, the operator may input his or her autonomous driving preference, e.g., via a user interface. For example, the operator may select specific vehicle controls to be operated autonomously, semi-autonomously, or manually in the first vehicle.

Additionally or alternatively, the autonomous driving preferences associated with an operator may be obtained by querying the operator as to what kind of vehicle the operator typically drives, (e.g., the make, model, model year, software year, etc.) That is, in some instances, the autonomous driving preference associated with the operator may be inferred based on the autonomous capabilities of the operator's usual vehicle.

A determination (block 404) may be made that the operator of the first vehicle is currently operating a second vehicle or is to operate a second vehicle. For example, the second vehicle may be a vehicle that the operator does not typically or frequently operate, and/or a vehicle that the operator has not operated before. For instance, the second vehicle may be a vehicle that the operator is borrowing, renting, or loaning, a ride-share vehicle, or, in some instances, a newly purchased vehicle. In some instances, a determination may be made that the operator is currently operating the second vehicle based on receiving data captured by a sensor associated with the second vehicle. The sensor data may be analyzed to identify an indication that the operator is near or inside the second vehicle. For example, the sensor data may include image data including the face of the operator, which may be used to identify the operator. As another example, the determination may be made that the operator is currently operating the second vehicle based on login or other credential information input by the operator. Additionally, an exemplary method for determining that the operator of the first vehicle is to operate a second vehicle is discussed in greater detail with respect to FIG. 7.

An indication of the autonomous driving preference associated with the operator may be transmitted (block 406) to the second vehicle, e.g., via a network, and vehicle controls associated with the second vehicle may be automatically modified (block 408) based on the autonomous driving preference associated with the operator. That is, the vehicle controls associated with the second vehicle may be modified from current vehicle control settings (e.g., default settings, manufacturer settings, previous operators' settings, etc.) to new vehicle control settings that match the autonomous driving preference associated with the operator. For example, a second vehicle that by default operates steering autonomously may switch to operating steering manually if the operator's autonomous driving preference for steering is to steer manually. As another example, a second vehicle that previously operated braking manually may switch to operating braking autonomously if the operator's autonomous driving preference for braking is to brake autonomously. In some instances, the method 400 may include additional steps and/or instructions, discussed in greater detail with respect to FIGS. 5 and 6.

Figure 5:
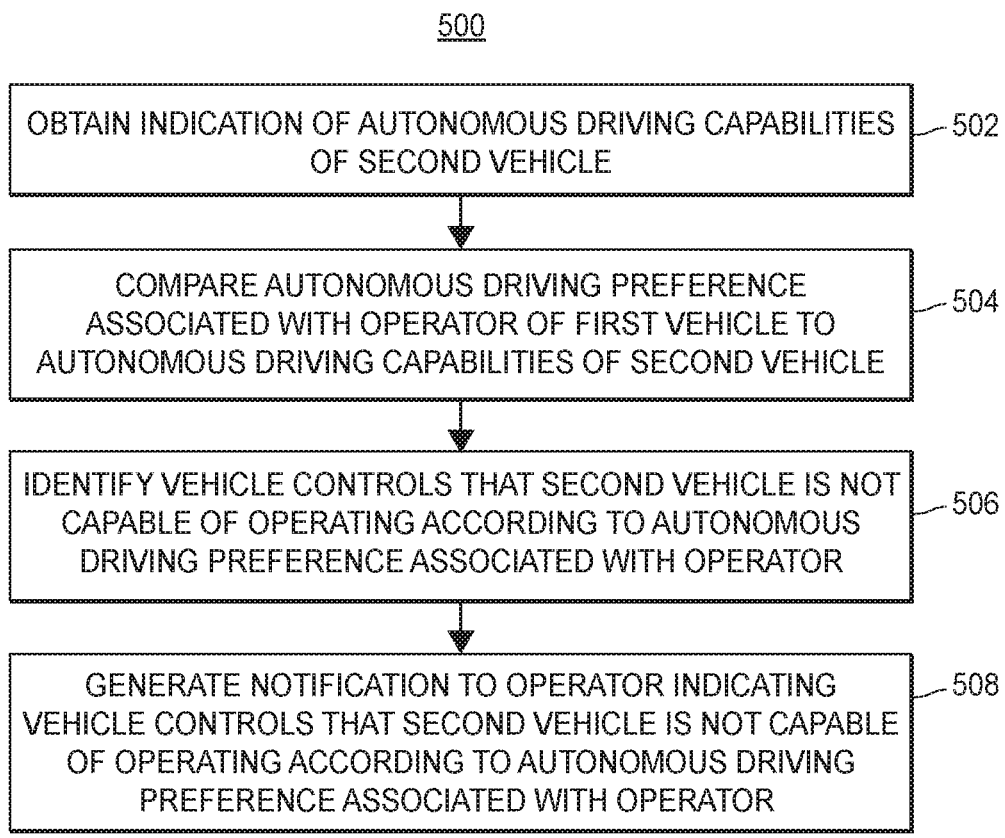
FIG. 5 illustrates a flow diagram of an exemplary computer-implemented method for notifying a vehicle operator when a vehicle is not capable of operating according to the operator's autonomous driving preferences, in accordance with some embodiments.

Turning now to FIG. 5, a flow diagram of an exemplary computer-implemented method 500 for notifying a vehicle operator when a vehicle is not capable of operating according to the operator's autonomous driving preferences is illustrated, in accordance with some embodiments. The method 500 can be implemented as a set of instructions stored on a computer-readable memory and executable on one or more processors.

An indication of the autonomous driving capabilities of the second vehicle may be obtained (block 502). Generally speaking, the indication of the autonomous driving capabilities of the second vehicle includes an indication of which vehicle controls (such as, e.g., steering, acceleration, braking, etc., as discussed above) the second vehicle is capable of operating autonomously, semi-autonomously, and/or manually. For example, in some instances, the second vehicle is capable of operating all vehicle controls autonomously. In other instances, the second vehicle is not capable of operating any vehicle controls autonomously, i.e., all vehicle controls must be operated manually. In still other instances, the second vehicle is capable of operating some vehicle controls autonomously or semi-autonomously, but some vehicle controls must be operated manually. For example, the second vehicle may be capable of semi-autonomous braking, but steering and acceleration must be operated manually. In additional instances, the second vehicle is only capable of operating certain vehicle controls autonomously, and is not capable of operating these vehicle controls manually. For example, the second vehicle may be fully autonomous and may not include a steering wheel, brake, and/or accelerator, etc.

The autonomous driving preference associated with the operator of the first vehicle (obtained at block 402) may be compared (block 504) to the autonomous driving capabilities of the second vehicle, and vehicle controls that the second vehicle is not capable of operating according to the autonomous driving preference associated with the operator may be identified (block 506). For example, if the operator of the first vehicle has an autonomous driving preference that includes autonomous steering, autonomous braking, and autonomous acceleration, but the second vehicle is capable of autonomous steering but not autonomous braking or autonomous acceleration, the braking and acceleration controls are identified.

A notification may be generated (block 508) for the operator, indicating the vehicle controls that the second vehicle is not capable of operating according to the autonomous driving preference associated with the operator. In the example described above, for instance, the notification would indicate that the second vehicle is not capable of autonomous braking or autonomous acceleration. In some instances, the notification may include a warning to the operator displayed via a user interface, e.g., as shown in FIG. 3B. The warning may be useful to the operator because the operator may not be operating certain vehicle controls in ways outside his or her autonomous driving preference. That is, if the operator's autonomous driving preference is to brake autonomously, but the second vehicle is not capable of braking autonomously, the operator may not immediately know or expect that second vehicle does not have this feature. Moreover, the operator may not immediately know how to brake manually using the controls of the second vehicle. In some instances, information may be provided to the operator so that the operator may familiarize him- or herself with the features of the second vehicle before attempting to operate it.

Figure 6:
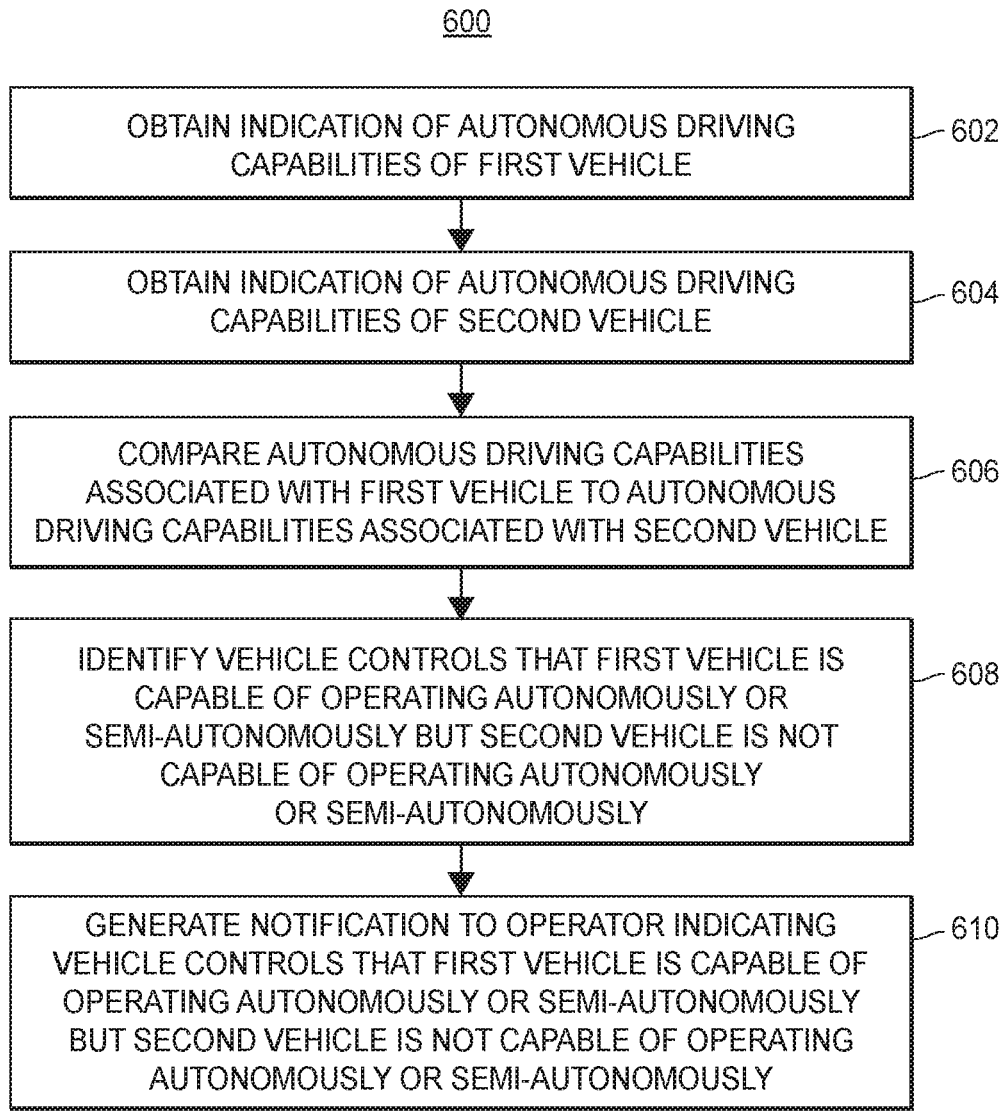
FIG. 6 illustrates a flow diagram of an exemplary computer-implemented method for comparing the autonomous driving capabilities of two vehicles and notifying a vehicle operator when the autonomous driving capabilities of the two vehicles differ, in accordance with some embodiments.

Turning now to FIG. 6, a flow diagram of an exemplary computer-implemented method 600 for comparing the autonomous driving capabilities of two vehicles and notifying a vehicle operator when the autonomous driving capabilities of the two vehicles differ is illustrated, in accordance with some embodiments. The method 600 can be implemented as a set of instructions stored on a computer-readable memory and executable on one or more processors.

An indication of the autonomous driving capabilities of the first vehicle may be obtained (block 602), and an indication of the autonomous driving capabilities of the second vehicle may be obtained (block 604). The indication of the autonomous driving capabilities of each vehicle includes an indication of which vehicle controls (such as, e.g., steering, acceleration, braking, etc., as discussed above) each vehicle is capable of operating autonomously, semi-autonomously, and/or manually.

The autonomous driving capabilities associated with the first vehicle may be compared (block 606) to the autonomous driving capabilities associated with the second vehicle. For example, in some instances, the first vehicle is capable of operating all vehicle controls autonomously, while the second vehicle is not capable of operating any vehicle controls autonomously, i.e., all vehicle controls must be operated manually. As another example, the first vehicle is capable of operating some vehicle controls (e.g., braking) autonomously or semi-autonomously, but some vehicle controls must be operated manually (e.g., steering and acceleration), while the second vehicle is capable of some different set of vehicle controls (e.g., steering) autonomously or semi autonomously, but other vehicle controls must be operated manually (e.g., braking and acceleration). In some examples, the first vehicle is capable of operating vehicle controls either autonomously or manually, while the second vehicle is only capable of operating certain vehicle controls autonomously, and is not capable of operating these vehicle controls manually. For example, in some instances, the second vehicle may be fully autonomous and may not include a steering wheel, brake, and/or accelerator, etc.

Based on the comparison, any vehicle controls that the first vehicle is capable of operating autonomously or semi-autonomously but the second vehicle is not capable of operating autonomously or semi-autonomously may be identified (block 608). For example, the braking control may be identified if the first vehicle is capable of braking autonomously or semi-autonomously but the second vehicle is not capable of braking autonomously. Additionally or alternatively, any vehicle controls that the first vehicle is not capable of operating autonomously or semi-autonomously but the second vehicle is capable of operating autonomously or semi-autonomously may be identified as well in some instances. For example, the steering control may be identified if the first vehicle is not capable of steering autonomously but the second vehicle is capable of steering autonomously.

A notification may be generated (block 610) for the operator indicating any vehicle controls that the first vehicle is capable of operating autonomously or semi-autonomously but the second vehicle is not capable of operating autonomously or semi-autonomously. For example, the notification may include a warning to the operator displayed on a user interface, e.g., as shown in FIG. 3B. The warning may be useful to the operator because the operator may not be accustomed to manual operation of that particular vehicle control. That is, if the operator typically operates the first vehicle, which is capable of braking autonomously, and switches to operating the second vehicle, which is not capable of braking autonomously, the operator may not immediately know that the second vehicle does not have this feature. Moreover, the operator may not immediately know how to brake manually using the controls of the second vehicle. Upon receiving the warning, the operator may familiarize him- or herself with the features of the second vehicle before attempting to operate it.

Additionally or alternatively, a notification may be generated for the operator indicating any vehicle controls that the first vehicle is not capable of operating autonomously or semi-autonomously but the second vehicle is capable of operating autonomously or semi-autonomously. In some instances, the notification may be displayed as a notice via a user interface, e.g., as shown in FIG. 3C. The notice may be useful to the operator, for example, in instances in which the second vehicle is an upgrade over the first vehicle in terms of autonomous features offered. In some instances, the operator may additionally be given an option to engage an autonomous vehicle control that the operator did not previously have access to in the first vehicle. Additionally, the operator may be provided with information about the autonomous vehicle control, e.g., via the user interface.

Figure 7:
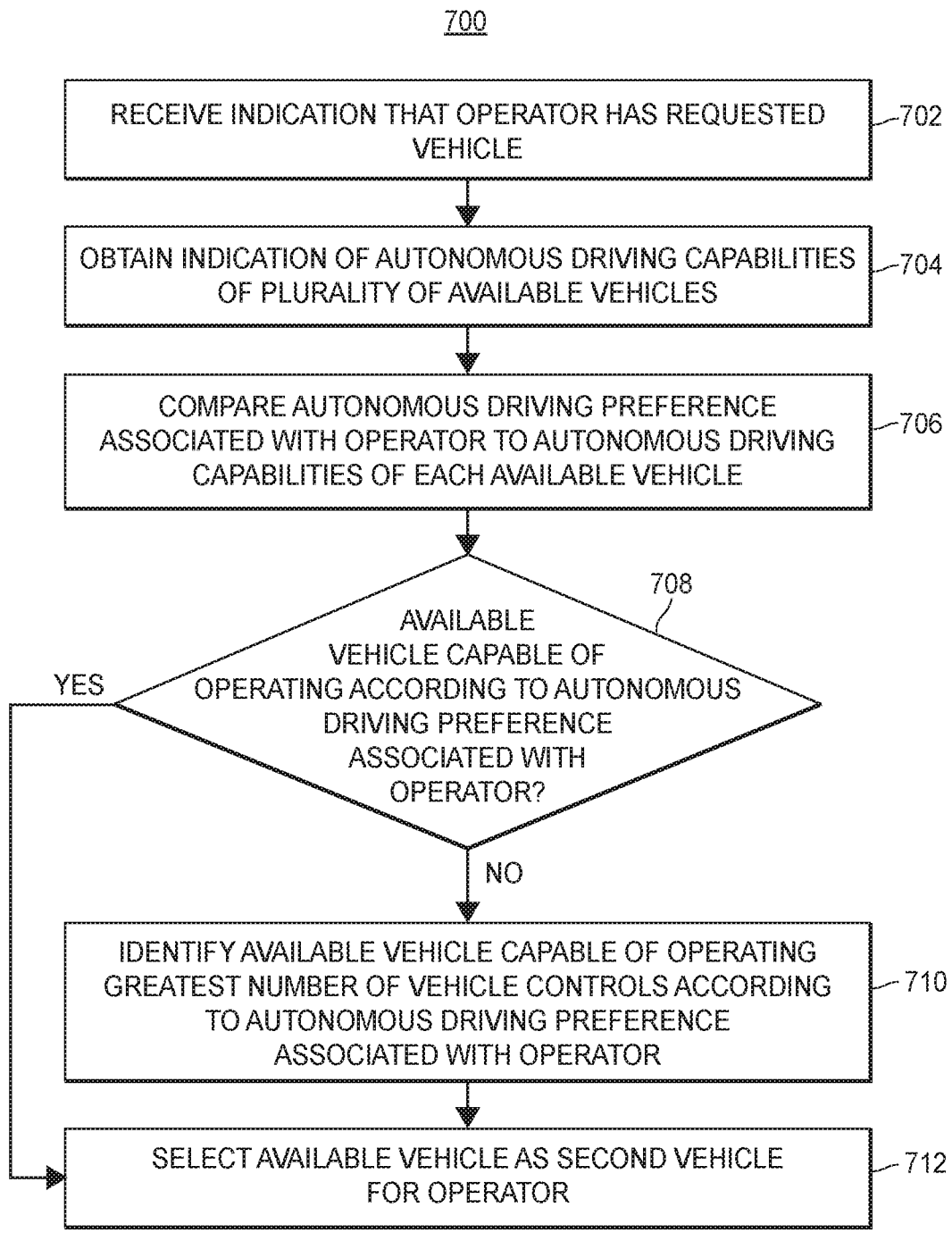
FIG. 7 illustrates a flow diagram of an exemplary computer-implemented method for selecting a vehicle for a vehicle operator based on the vehicle operator's autonomous driving preferences, in accordance with some embodiments.

Turning now to FIG. 7, a flow diagram of an exemplary computer-implemented method 700 for determining that the operator of the first vehicle is to operate a second vehicle is illustrated, in accordance with some embodiments. The method 700 can be implemented as a set of instructions stored on a computer-readable memory and executable on one or more processors.

An indication that the operator has requested a vehicle may be received (block 702). For example, the operator may input a request for a vehicle via a website or a mobile device application associated with rental vehicles. The request may include, for example, the dates for which the rental vehicle is needed, the number of passengers, etc.

An indication of the respective autonomous driving capabilities of each of a plurality of available vehicles may be obtained (block 704). For example, a database associated with rental vehicles may be continuously or periodically updated to indicate current vehicle availability. The database may further store data indicating the respective autonomous driving capabilities of each available vehicle. The database may be accessed to obtain an indication of the respective autonomous driving capabilities of each of the plurality of available vehicles.

The autonomous driving preferences associated with the operator may be compared (block 706) to the autonomous driving capabilities of each available vehicle, to determine (block 708) whether there is an available vehicle capable of operating according to the autonomous driving preference associated with the operator. If there is no available vehicle capable of operating according to the autonomous driving preference associated with the operator (block 708, NO), an available vehicle capable of operating the greatest number of vehicle controls according to the autonomous driving preference associated with the operator may be identified (block 710) and selected (block 712) as the second vehicle that the operator is to operate. If there is an available vehicle capable of operating according to the autonomous driving preference associated with the operator (block 708, YES), then that vehicle may be selected (block 712) as the second vehicle that the operator is to operate.

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission or affirmative consent. The data collected may be related to insured assets before (and/or after) an insurance-related event, including those events discussed elsewhere herein. In return, risk averse insureds may receive discounts or insurance cost savings related to home, renters, personal articles, auto, and other types of insurance from the insurance provider.

In one aspect, data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Although the foregoing text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within an office environment, or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

Unless a claim element is defined by reciting the word "means" and a function without the recital of any structure, it is not intended that the scope of any claim element be interpreted based upon the application of 35 U.S.C. § 112(f). The systems and methods described herein are directed to an improvement to computer functionality, and improve the functioning of conventional computers.

What is claimed:

1. A computer-implemented method for automatically transferring autonomous driving preferences between vehicles, comprising:
   obtaining, by a processor, an autonomous driving preference associated with an operator of a first vehicle, wherein the autonomous driving preference includes at least one of the following:
   (i) a first vehicle braking control that the operator prefers to be operated autonomously, semi-autonomously, or manually,
   (ii) a first vehicle steering control that the operator prefers to be operated autonomously, semi-autonomously, or manually, or
   (iii) a first vehicle acceleration control that the operator prefers to operate autonomously, semi-autonomously, or manually;
   determining, by a processor, that the operator of the first vehicle is to operate a second vehicle or is currently operating a second vehicle;
   transmitting, by a processor, an indication of the autonomous driving preference associated with the operator to the second vehicle;
   modifying, by a processor, one or more of a second vehicle braking control, a second vehicle steering control, or a second vehicle acceleration control associated with the second vehicle based on the autonomous driving preference associated with the operator such that a first one of the second vehicle braking control, the second vehicle steering control, and the second vehicle acceleration control operates autonomously or semi-autonomously, and a second one of the second vehicle braking control, the second vehicle steering control, and the second vehicle acceleration control operates manually; and generating, by a processor, a notification to the operator, indicating one or more of the first vehicle braking control, the first vehicle steering control, or the first vehicle acceleration control that the first vehicle is capable of operating autonomously or semi-autonomously that the second vehicle is not capable of operating autonomously or semi-autonomously.

2. The method of claim 1, further comprising:

obtaining, by a processor, an indication of autonomous driving capabilities of the second vehicle, wherein the autonomous driving capabilities of the second vehicle include:
  (i) the second vehicle braking control that the second vehicle is capable of operating autonomously, semi-autonomously, or manually,
  (ii) the second vehicle steering control that the second vehicle is capable of operating autonomously, semi-autonomously, or manually, and
  (iii) the second vehicle acceleration control that the second vehicle is capable of operating autonomously, semi-autonomously, or manually;

comparing, by a processor, the autonomous driving preference associated with the operator of the first vehicle to the autonomous driving capabilities of the second vehicle;

identifying, by a processor, based on the comparing, one or more of the second vehicle braking control, the second vehicle steering control, or the second vehicle acceleration control that the second vehicle is not capable of operating according to the autonomous driving preference associated with the operator; and generating, by a processor, a notification to the operator indicating the one or more vehicle controls that the second vehicle is not capable of operating according to the autonomous driving preference associated with the operator.

3. The method of claim 1, further comprising:

obtaining, by a processor, an indication of autonomous driving capabilities of the first vehicle, wherein the autonomous driving capabilities of the first vehicle include:
  (i) the first vehicle braking control that the first vehicle is capable of operating autonomously, semi-autonomously, or manually;
  (ii) the first vehicle steering control that the first vehicle is capable of operating autonomously, semi-autonomously or manually, and
  (iii) the first vehicle braking controls that the first vehicle is capable of operating autonomously, semi-autonomously, or manually;

obtaining, by a processor, an indication of autonomous driving capabilities of the second vehicle, wherein the autonomous driving capabilities of the second vehicle include:
  (i) the second vehicle braking control that the second vehicle is capable of operating autonomously, semi-autonomously, or manually,
  (ii) the second vehicle steering control that the second vehicle is capable of operating autonomously, semi-autonomously, or manually, and
  (iii) the second vehicle acceleration control that the second vehicle is capable of operating autonomously, semi-autonomously, or manually;

comparing, by a processor, the autonomous driving capabilities of the first vehicle to the autonomous driving capabilities of the second vehicle;

identifying, by a processor, based on the comparing, one or more of the first vehicle braking control, the first vehicle steering control, or the first vehicle acceleration control that the first vehicle is not capable of operating autonomously or semi-autonomously and the second vehicle is capable of operating autonomously or semi-autonomously; and generating, by a processor, a notification to the operator indicating the one or more of the first vehicle braking control, the first vehicle steering control, or the first vehicle acceleration control that the first vehicle is not capable of operating autonomously or semi-autonomously and the second vehicle is capable of operating autonomously or semi-autonomously.

4. The method of claim 1, wherein obtaining, by a processor, an autonomous driving preference associated with an operator of a first vehicle further comprises:

obtaining, by a processor, vehicle telematics data associated with the first vehicle;

analyzing, by a processor, the vehicle telematics data associated with the first vehicle to determine one or more of:
  (i) a first vehicle braking control that the operator prefers to be operated autonomously, semi-autonomously, or manually,
  (ii) a first vehicle steering control that the operator prefers to be operated autonomously, semi-autonomously, or manually, or
  (iii) a first vehicle acceleration control that the operator prefers to operate autonomously, semi-autonomously, or manually; and determining, by a processor, based on the analyzing, an autonomous driving preference associated with the operator of the first vehicle.

5. The method of claim 1, wherein obtaining an autonomous driving preference associated with an operator of a first vehicle comprises:

receiving, by a processor, an input from the operator indicating an autonomous driving preference associated with the operator.

6. The method of claim 1, wherein modifying one or more of the second vehicle braking control, the second vehicle steering control, or the second vehicle acceleration control associated with the second vehicle based on the autonomous driving preference associated with the operator comprises:

causing, by a processor, one or more of the second vehicle braking control, the second vehicle steering control, or the second vehicle acceleration control that the second vehicle is capable of operating autonomously or semi-autonomously to be operated manually by the operator of the second vehicle, based on the autonomous driving preference associated with the operator.

7. The method of claim 1, wherein determining that the operator of the first vehicle is to operate a second vehicle comprises:

receiving, by a processor, an indication that the operator has requested a vehicle;

obtaining, by a processor, an indication of autonomous driving capabilities of a plurality of available vehicles, wherein the autonomous driving capabilities of each available vehicle include one or more of:
  (i) an available vehicle braking control that the available vehicle is capable of operating autonomously, semi-autonomously, or manually,
  (ii) an available vehicle steering control that the available vehicle is capable of operating autonomously, semi-autonomously, or manually, and
  (iii) an available vehicle acceleration control that the available vehicle is capable of operating autonomously, semi-autonomously, or manually;
comparing, by a processor, the autonomous driving preference associated with the operator to the autonomous driving capabilities of each of the plurality of available vehicles;
identifying, by a processor, an available vehicle capable of operating according to the autonomous driving preference associated with the operator; and
selecting, by a processor, the available vehicle as the second vehicle for the operator.

8. The method of claim 1, wherein determining that the operator of the first vehicle is to operate a second vehicle comprises:
receiving, by a processor, an indication that the operator has requested a vehicle;
obtaining, by a processor, an indication of autonomous driving capabilities of a plurality of available vehicles, wherein the autonomous driving capabilities of each available vehicle include one or more of:
  (i) an available vehicle braking control that the available vehicle is capable of operating autonomously, semi-autonomously, or manually,
  (ii) an available vehicle steering control that the available vehicle is capable of operating autonomously, semi-autonomously, or manually, and
  (iii) an available vehicle acceleration control that the available vehicle is capable of operating autonomously, semi-autonomously, or manually;
comparing, by a processor, the autonomous driving preference associated with the operator to the autonomous driving capabilities of each of the plurality of available vehicles;
identifying, by a processor, an available vehicle, of the plurality of available vehicles, capable of operating the greatest number of vehicle controls according to the autonomous driving preference associated with the operator;
and selecting, by a processor, the available vehicle as the second vehicle for the operator.

9. The method of claim 1, wherein determining that the operator of the first vehicle is to operate a second vehicle or is currently operating a second vehicle comprises:
receiving, by a processor, sensor data captured by a sensor associated with the second vehicle; and
analyzing, by a processor, the sensor data to identify an indication that the operator is near the second vehicle.

10. The method of claim 1, further comprising:
prompting, by a processor, the operator to indicate whether to modify vehicle controls of the second vehicle based on the autonomous driving preference associated with the operator.

11. A computer system for automatically transferring autonomous driving preferences between vehicles, comprising:
one or more processors; and
one or more memories storing instructions that, when executed by the one or more processors, cause the computer system to:
obtain an autonomous driving preference associated with an operator of a first vehicle, wherein the autonomous driving preference includes at least one of the following:
  (i) a first vehicle braking control that the operator prefers to be operated autonomously, semi-autonomously, or manually,
  (ii) a first vehicle steering control that the operator prefers to be operated autonomously, semi-autonomously, or manually, or
  (iii) a first vehicle acceleration control that the operator prefers to operate autonomously, semi-autonomously, or manually;
determine that the operator of the first vehicle is to operate a second vehicle or is currently operating a second vehicle;
transmit an indication of the autonomous driving preference associated with the operator to the second vehicle;
modify one or more of a second vehicle braking control, a second vehicle steering control, or a second vehicle acceleration control associated with the second vehicle based on the autonomous driving preference associated with the operator, such that a first one of the second vehicle braking control, the second vehicle steering control, and the second vehicle acceleration control operates autonomously or semi-autonomously, and a second one of the second vehicle braking control, the second vehicle steering control, and the second vehicle acceleration control operates manually; and
generate a notification to the operator indicating one or more of the first vehicle braking control, the first vehicle steering control, or the first vehicle acceleration control that the first vehicle is capable of operating autonomously or semi-autonomously that the second vehicle is not capable of operating autonomously or semi-autonomously.

12. The computer system of claim 11, wherein the instructions, when executed by the one or more processors, further cause the computer system to:
obtain an indication of autonomous driving capabilities of the second vehicle, wherein the autonomous driving capabilities of the second vehicle include:
  (i) the second vehicle braking control that the second vehicle is capable of operating autonomously, semi-autonomously, or manually,
  (ii) the second vehicle steering control that the second vehicle is capable of operating autonomously, semi-autonomously, or manually, and
  (iii) the second vehicle acceleration control that the second vehicle is capable of operating autonomously, semi-autonomously, or manually;
compare the autonomous driving preference associated with the operator of the first vehicle to the autonomous driving capabilities of the second vehicle;
identify, based on the comparing, one or more one or more of the second vehicle braking control, the second vehicle steering control, or the second vehicle acceleration control that the second vehicle is not capable of operating according to the autonomous driving preference associated with the operator; and
generate a notification to the operator indicating the one or more vehicle controls that the second vehicle is not capable of operating according to the autonomous driving preference associated with the operator.

13. The computer system of claim 11, wherein the instructions, when executed by the one or more processors, further cause the computer system to:
obtain an indication of autonomous driving capabilities of the first vehicle, wherein the autonomous driving capabilities of the first vehicle include:
(i) the first vehicle braking control that the first vehicle is capable of operating autonomously, semi-autonomously, or manually;
(ii) the first vehicle steering control that the first vehicle is capable of operating autonomously, semi-autonomously or manually, and
(iii) the first vehicle braking controls that the first vehicle is capable of operating autonomously, semi-autonomously, or manually;
obtain an indication of autonomous driving capabilities of the second vehicle, wherein the autonomous driving capabilities of the second vehicle include:
(i) the second vehicle braking control that the second vehicle is capable of operating autonomously, semi-autonomously, or manually,
(ii) the second vehicle steering control that the second vehicle is capable of operating autonomously, semi-autonomously, or manually, and
(iii) the second vehicle acceleration control that the second vehicle is capable of operating autonomously, semi-autonomously, or manually;
compare the autonomous driving capabilities of the first vehicle to the autonomous driving capabilities of the second vehicle;
identify, based on the comparing, one or more of the first vehicle braking control, the first vehicle steering control, or the first vehicle acceleration control that the first vehicle is not capable of operating autonomously or semi-autonomously and the second vehicle is capable of operating autonomously or semi-autonomously; and
generate a notification to the operator indicating the one or more of the first vehicle braking control, the first vehicle steering control, or the first vehicle acceleration control that the first vehicle is not capable of operating autonomously or semi-autonomously and the second vehicle is capable of operating autonomously or semi-autonomously.

14. The computer system of claim 11, wherein the instructions, when executed by the one or more processors, cause the computer system to obtain an autonomous driving preference associated with an operator of a first vehicle by:
obtaining vehicle telematics data associated with the first vehicle;
analyzing the vehicle telematics data associated with the first vehicle to determine one or more of:
(i) the first vehicle braking control that the operator prefers to be operated autonomously, semi-autonomously, or manually,
(ii) the first vehicle steering control that the operator prefers to be operated autonomously, semi-autonomously, or manually, or
(iii) the first vehicle acceleration control that the operator prefers to operate autonomously, semi-autonomously, or manually; and
determining, based on the analyzing, an autonomous driving preference associated with the operator of the first vehicle.

15. The computer system of claim 11, wherein the instructions, when executed by the one or more processors, cause the computer system to obtain an autonomous driving preference associated with an operator of a first vehicle by receiving an input from the operator indicating an autonomous driving preference associated with the operator.

16. The computer system of claim 11, wherein the instructions, when executed by the one or more processors, cause the computer system to modify one or more of the second vehicle braking control, the second vehicle steering control, or the second vehicle acceleration control associated with the second vehicle based on the autonomous driving preference associated with the operator by:
causing one or more of the second vehicle braking control, the second vehicle steering control, or the second vehicle acceleration control that the second vehicle is capable of operating autonomously or semi-autonomously to be operated manually by the operator of the second vehicle, based on the autonomous driving preference associated with the operator.

17. The computer system of claim 11, wherein the instructions, when executed by the one or more processors, cause the computer system to determine that the operator of the first vehicle is to operate the second vehicle by:
receiving an indication that the operator has requested a vehicle;
obtaining an indication of autonomous driving capabilities of a plurality of available vehicles, wherein the autonomous driving capabilities of each available vehicle include one or more of:
(i) an available vehicle braking control that the available vehicle is capable of operating autonomously, semi-autonomously, or manually,
(ii) an available vehicle steering control that the available vehicle is capable of operating autonomously, semi-autonomously, or manually, and
(iii) an available vehicle acceleration control that the available vehicle is capable of operating autonomously, semi-autonomously, or manually;
comparing the autonomous driving preference associated with the operator to the autonomous driving capabilities of each of the plurality of available vehicles; and
identifying an available vehicle capable of operating according to the autonomous driving preference associated with the operator;
and selecting the available vehicle as the second vehicle for the operator.

18. The computer system of claim 11, wherein the instructions, when executed by the one or more processors, cause the computer system to determine that the operator of the first vehicle is to operate the second vehicle by:
receiving an indication that the operator has requested a vehicle;
obtaining an indication of autonomous driving capabilities of a plurality of available vehicles, wherein the autonomous driving capabilities of each available vehicle include one or more of:
(i) an available vehicle braking control that the available vehicle is capable of operating autonomously, semi-autonomously, or manually,
(ii) an available vehicle steering control that the available vehicle is capable of operating autonomously, semi-autonomously, or manually, and
(iii) an available vehicle acceleration control that the available vehicle is capable of operating autonomously, semi-autonomously, or manually;
comparing the autonomous driving preference associated with the operator to the autonomous driving capabilities of each of the plurality of available vehicles; and
identifying an available vehicle, of the plurality of available vehicles, capable of operating the greatest number of vehicle controls according to the autonomous driving preference associated with the operator;
and selecting the available vehicle as the second vehicle for the operator.

19. The computer system of claim 11, wherein the instructions, when executed by the one or more processors, further cause the computer system to prompt the operator to indicate whether to modify vehicle controls of the second vehicle based on the autonomous driving preference associated with the operator.

20. A computer-readable storage medium having stored thereon a set of instructions, executable by a processor, for automatically transferring autonomous driving preferences between vehicles, the instructions comprising instructions for:
- obtaining an autonomous driving preference associated with an operator of a first vehicle, wherein the autonomous driving preference includes at least one of the following:
  - (i) a first vehicle braking control that the operator prefers to be operated autonomously, semi-autonomously, or manually,
  - (ii) a first vehicle steering control that the operator prefers to be operated autonomously, semi-autonomously, or manually, or
  - (iii) a first vehicle acceleration control that the operator prefers to operate autonomously, semi-autonomously, or manually;
- determining that the operator of the first vehicle is to operate a second vehicle or is currently operating a second vehicle;
- transmitting an indication of the autonomous driving preference associated with the operator to the second vehicle;
- modifying one or more of a second vehicle braking control, a second vehicle steering control, or a second vehicle acceleration control associated with the second vehicle based on the autonomous driving preference associated with the operator, such that a first one of the second vehicle braking control, the second vehicle steering control, and the second vehicle acceleration control operates autonomously or semi-autonomously, and a second one of the second vehicle braking control, the second vehicle steering control, and the second vehicle acceleration control operates manually; and
- generating a notification to the operator indicating one or more of the first vehicle braking control, the first vehicle steering control, or the first vehicle acceleration control that the first vehicle is capable of operating autonomously or semi-autonomously that the second vehicle is not capable of operating autonomously or semi-autonomously.

* * * * *